United States Patent [19]
Cain et al.

[11] 3,905,710
[45] Sept. 16, 1975

[54] SHAFT COUPLING HAVING A KEYWAY INSERT AND METHOD FOR FORMING THE SAME

[75] Inventors: Earl S. Cain, Portola Valley; Jerome A. Carlson, Woodside; David R. Billings, Los Alamitos, all of Calif.

[73] Assignee: Bearings, Seals, & Gears, Inc., Redwood City, Calif.

[22] Filed: Mar. 2, 1973

[21] Appl. No.: 337,565

[52] U.S. Cl. ............................ 403/4; 403/356
[51] Int. Cl.² ............................ F16D 1/08
[58] Field of Search .......... 403/3, 4, 356, 358, 355, 403/318, 357, 362

[56] References Cited
UNITED STATES PATENTS

| | | | |
|---|---|---|---|
| 111,550 | 2/1871 | Kean | 403/318 |
| 705,792 | 7/1902 | Schlacks | 403/317 |
| 1,405,590 | 2/1922 | Hudson | 403/3 |
| 1,812,226 | 6/1931 | Walker | 403/358 X |
| 1,898,264 | 2/1933 | Proefke | 403/362 X |
| 3,250,553 | 5/1966 | Detwiler | 403/358 |
| 3,666,304 | 5/1972 | Wilder | 403/356 |
| R25,929 | 12/1965 | Luenberger | 403/356 |

*Primary Examiner*—Andrew V. Kundrat
*Attorney, Agent, or Firm*—Flehr, Hohbach, Test, Albritton & Herbert

[57] ABSTRACT

A shaft coupling having a passage for accommodating an insert in which a keyway can be easily milled. The shaft coupling and insert are machined or bored to accommodate an associated shaft and the key insert is removable to have a keyway machined therein so that it may be reinserted in the coupling to form a shaft coupling including a keyway.

7 Claims, 15 Drawing Figures

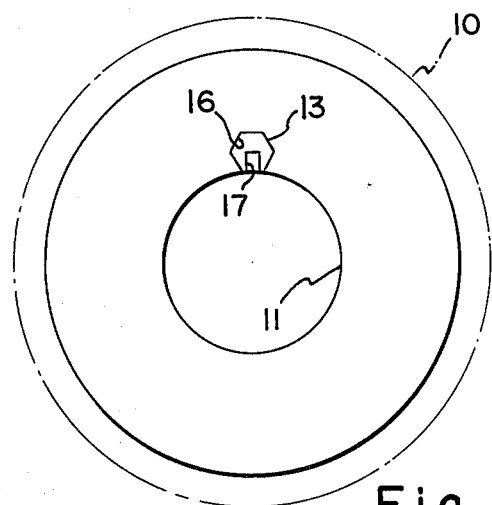
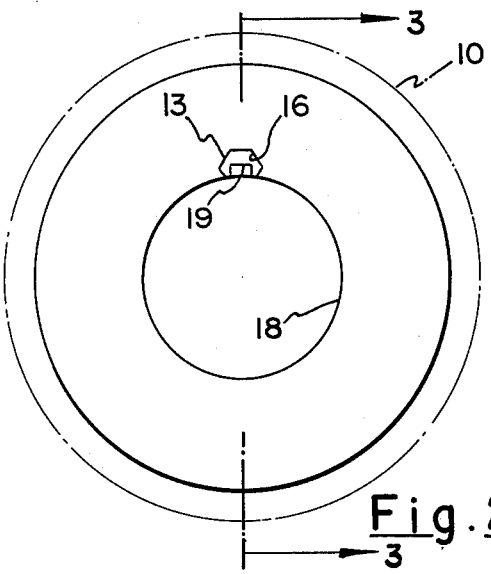
Fig.1  Fig.2
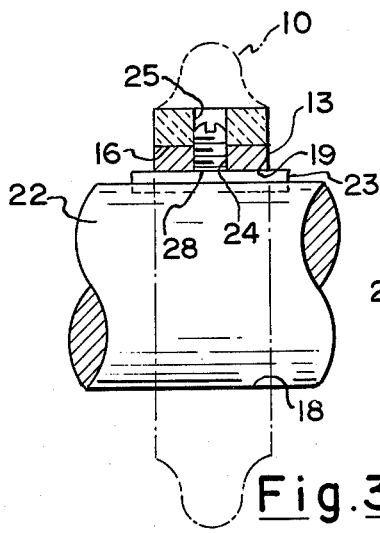 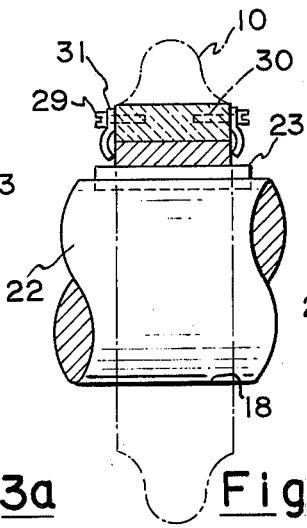 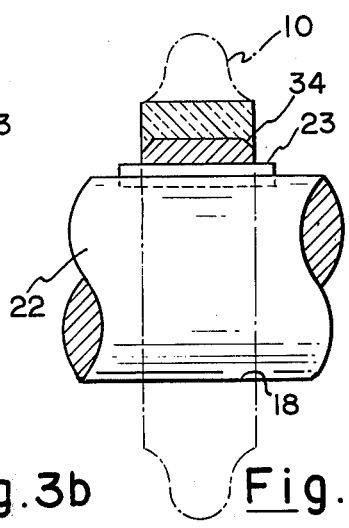
Fig.3a  Fig.3b  Fig.3c
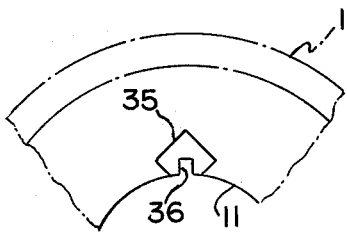 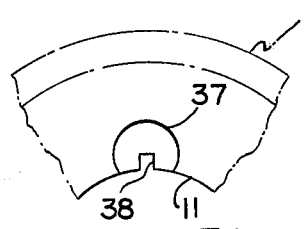 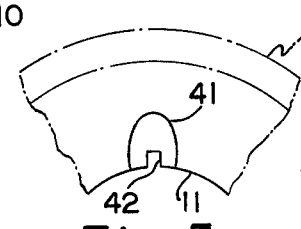
Fig.5a  Fig.5b  Fig.5c
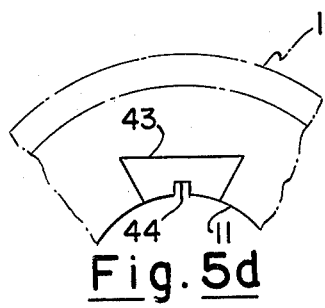 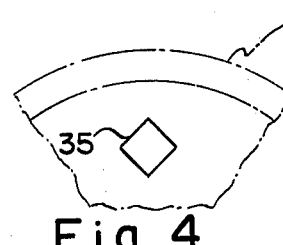 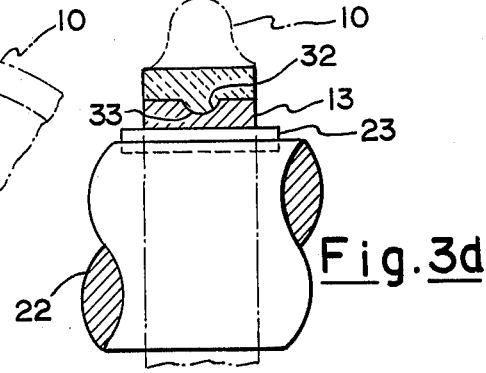
Fig.5d  Fig.4  Fig.3d

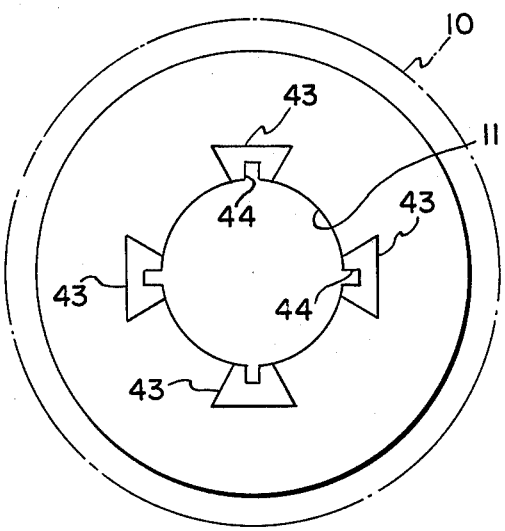
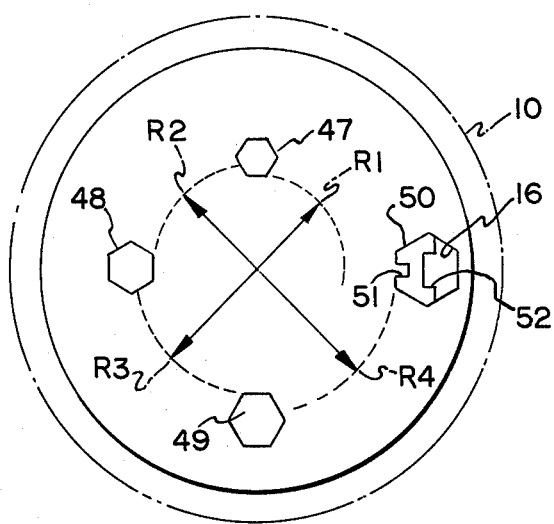
Fig.6    Fig.7
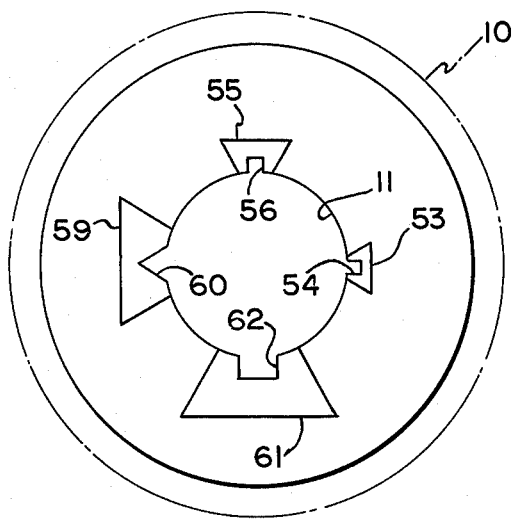
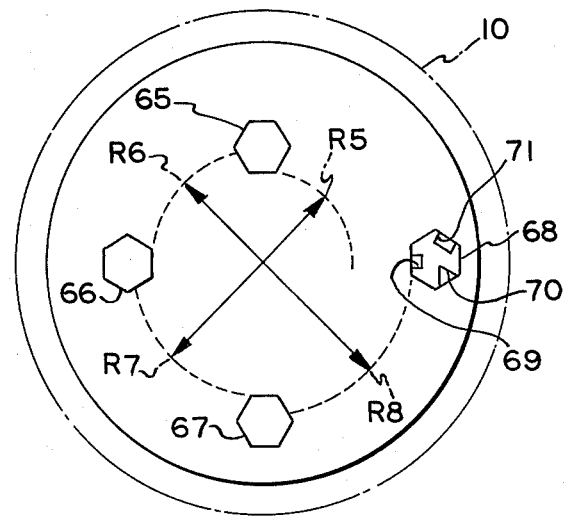
Fig.8    Fig.9

SHAFT COUPLING HAVING A KEYWAY INSERT AND METHOD FOR FORMING THE SAME

BACKGROUND OF THE INVENTION

This invention relates to shaft couplings and more particularly to a shaft coupling having a passage for accommodating a keyway insert which can be removed and machined with a keyway independently of the coupling.

In the past it has been the practice to manufacture shaft couplings such as sheaves, gears, cams, sprockets, and the like on an associated shaft with specific axial bore diameters to fit specific shaft diameters, and then to form a keyway in the bore using relatively expensive machining processes such as broaching. A bore once formed with a keyway cannot be enlarged without removing or reducing the depth of the keyway. This requires a repetition of the broaching operation to reestablish the keyway. Consequently shaft couplings having many different bore diameters must be stocked.

Many configurations of keyway may exist for each bore diameter. This added variable increases the required inventory size to unwieldy proportions if an attempt is made to cover all possible combinations of shaft coupling type, bore diameter, and keyway configuration.

Means are needed by which each type of shaft coupling may be made available in semi-finished condition, covering a range of finish bore sizes, and by which the desired keyway configuration may be obtained utilizing simple, inexpensive machining operations.

SUMMARY OF THE INVENTION AND OBJECTS

The invention disclosed herein includes a shaft coupling including a retaining groove for a keyway insert in which the coupling having the keyway insert placed therein is bored or machined to a diameter to accommodate an associated shaft and in which the insert is thereafter removed and machined to form a keyway and reinserted to form a shaft coupling including a keyway.

In general it is an object of the present invention to provide a shaft coupling having a keyway insert for fabrication of a bore and keyway to match a specific shaft and key configuration using the simplest of machining operations.

It is another object of the present invention to provide a shaft coupling of the above character which has a removable keyway insert in which the keyway is formed while the insert is removed from the member.

It is another object of the present invention to provide a shaft coupling of the above character which has a plurality of inserts on the same diameter having keyways for mating with a plurality of keys in the shaft.

It is another object of the present invention to provide a shaft coupling of the above character which has a plurality of inserts on varying diameters so that one of the inserts may provide a keyway for a shaft of a specified diameter.

It is another object of the present invention to provide a keyway insert having a plurality of keyways for accepting any one of a plurality of key configurations.

It is another object of the present invention to provide a keyway insert having a keyway which is positively retained in the member.

These and other objects of the present invention will become apparent upon reference to the included drawings and the description of the preferred embodiments.

BRIEF DESCRIPTION OF THE DRAWINGS

FIG. 1 is a plan view of a shaft coupling showing a keyway insert installed.

FIG. 2 is a plan view of a shaft coupling with a larger bore showing the keyway insert installed.

FIG. 3a is a sectional view along the line 3—3 of FIG. 2 showing keyway insert retaining means.

FIG. 3b is a sectional view along the line 3—3 of FIG. 2 showing alternate keyway insert retaining means.

FIG. 3c is a sectional view along the line 3—3 of FIG. 2 showing additional keyway insert retaining means.

FIG. 4 is a detail view showing the keyway insert installed in the shaft coupling.

FIG. 5a is a detail view of one configuration of keyway insert with keyway.

FIG. 5b is a detail view of an alternate keyway insert configuration with keyway.

FIG. 5c is a detail view of an additional keyway insert configuration with keyway.

FIG. 5d is a detail view of another keyway insert configuration with keyway.

FIG. 6 is a plan view showing multiple keyway inserts of the same size located on the same diameter.

FIG. 7 is a plan view showing multiple keyway inserts of variable size located at varying diameters.

FIG. 8 is a plan view showing multiple keyway inserts of variable size located at the same diameter.

FIG. 9 is a plan view showing multiple keyway inserts of the same size located at varying diameters.

DESCRIPTION OF THE PREFERRED EMBODIMENT

FIG. 1 shows a shaft coupling 10 such as a sheave, cam, gear, sprocket or the like which has an axial bore 11 with one or more retaining grooves or slots 16 formed in walls of the bore 11 and adapted to accommodate a keyway insert 13. Preferably, the shaft coupling 10 is formed with a bore of a diameter less than that of an associated shaft to which it is to be coupled. The keyway insert 13 is inserted and thereafter the bore 11 with the keyway insert 13 in place is machined to a bore diameter adapted to accommodate the associated shaft. Thereafter, the keyway insert 13 is removed and machined to form a longitudinal keyway slot 17, and reinserted in the shaft coupling 10 to form a shaft coupling 10 with a bore 11 adapted to accommodate the shaft including the keyway 17 facing the bore 11 and adapted to receive a key for locking the shaft coupling 10 to the associated shaft. It is to be noted that the retaining groove or slot 16 which is adapted to accommodate the keyway insert 13 is configured such that the opening which intersects the walls of the bore 11 has a width which is less than the width of other portions of the groove or opening 16 whereby when a keyway insert 13 is accommodated in the groove or opening 16 it is held against radial movement.

FIG. 2 shows the same shaft coupling 10 with the keyway insert 13 in the retaining groove or slot 16. A bore 18 is formed in the shaft coupling 10 which is larger than bore 11. A keyway 19 of different configuration than keyway 17 is shown.

FIGS. 3a, b, and c show shaft coupling 10 with bore 18 mounted on a shaft 22 having a key 23. FIG. 3a shows means for retaining keyway insert 13 in retaining groove 16. A threaded hole 24 is formed in keyway insert 13. A clearance hole 25 in shaft coupling 10 is aligned with hole 24. A set screw 28 accessible through hole 25 engages the threads in hole 24 and may extend into clearance hole 25.

FIG. 3b shows an alternate retaining means for keyway insert 13. Shaft coupling 10 has threaded holes 30 formed therein. Screws 29 mate with the threads in holes 30 and secure a pair of spring clips 31 which bear on both ends of keyway insert 13. Additional means for retaining keyway insert 13 is shown in FIG. 3c. Retaining groove 16 is formed with depending edges 34 at each end of the groove 16. Certain cements may also be used to retain the keyway insert 13.

The keyway insert and retaining groove or passage may take any one of a number of shapes. FIG. 4 shows a diamond shaped keyway insert 35 which is retained in a matching diamond shaped passage. No bore is shown in shaft coupling 10 in FIG. 4 so that the configuration of insert 35 may be shown before it is cut to match a bore and before it acquires a keyway.

FIGS. 5a, b, c and d show various acceptable keyway insert configurations and matching retaining groove shapes. FIG. 5a shows the insert 35 having a generally diamond shaped cross section and having an inner face formed to match bore 11 and a keyway 36 which is in communication with bore 11. FIG. 5b shows an insert 37 having a generally circular cross section and having an inner face matching bore 11 and a keyway 38 in communication with bore 11. FIGS. 5c shows an insert 41 having a generally oval cross section and having an inner face matching bore 11 and a keyway 42 in communication with bore 11. FIG. 5d shows an insert 43 having a generally trapezoidal cross section and having an inner face matching bore 11 and a keyway 44 in communication with bore 11.

A plurality of keyway inserts of acceptable configuration may be provided where a shaft has multiple splines. FIG. 6 shows four generally trapezoidal inserts 43 with keyways 44 all in communication with bore 11 in shaft coupling 10.

A plurality of keyway inserts having variable size and acceptable shapes may be provided on different diameters as best seen in FIG. 7. A small insert 47 having a hexagonal cross section is positioned with its inner face at a distance $R_1$ from the axis of member 10. A larger insert 48 is positioned at a distance $R_2$ from the axis. A still larger insert 49 is positioned at a distance $R_3$ from the axis. An insert 50 is positioned at a distance $R_4$ from the axis. Insert 50 illustrates a configuration having preformed keyways 51 and 52. No bore is shown in the shaft coupling 10 of FIG. 7 so that all inserts may be shown together, though only one is used to provide a keyway for a particular shaft size.

A configuration affording varying size or configuration of inserts on the same diameter is shown in FIG. 8. A small insert 53 generally trapezoidal in cross section has a small keyway 54 in communication with bore 11. A larger insert 55 has a larger keyway 56 in communication with bore 11. A still larger insert 59 has a two sided keyway 60 in communication with bore 11. An insert 61 is the largest shown in this embodiment and has a keyway 62 in communication with bore 11.

A plurality of keyway inserts of the same size on varying diameters may be provided as best seen in FIG. 9. An insert 65 having a hexagonal cross section is positioned with its inner face on radius $R_5$. An insert 66 is positioned with its inner face on radius $R_6$. An insert 67 is positioned with its inner face on radius $R_7$. An insert 68 is positioned with its inner face on radius $R_8$. Insert 68 has several keyway configurations as seen at 69, 70 and 71. Only the smallest bore is shown having a radius of $R_5$ in FIG. 9 so that all inserts may be shown together, though only one is used to provide a keyway for a particular keyed shaft size.

The shaft coupling 10 may be made of many different materials including plastics, metals, compositions, and the like. The inserts represented by insert 13 may be of any material having the capability of withstanding the forces imposed thereon. By way of example insert 13 may be of different material than that from which the shaft coupling 10 is made to minimize keyway stress and wear. The insert shapes discussed are acceptable configurations though they are not limiting. It should be noted that the insert 13 in FIGS. 1 and 2 is positioned at the same radius and is the same size. More of insert 13 is cut away in FIG. 2 due to the larger bore 18. In both cases the shape of the insert is such that the face of the insert in communication with bores 11 and 18 is narrower than the insert width at greater distances from the axis of the bores 11 and 18. This feature is also present in the insert configurations shown in FIGS. 5a, 5b, 5c and 5d. Since the retaining groove or passage 16 in FIGS. 1 and 2 and those surrounding inserts 35, 37, 41 and 43 match the external configuration of their respective keyway inserts the passages, typified by passage 16, may also be said to be narrower at the intersection with the walls of bores 11 and 18 than at some greater radial distances from the bore axis. The configuration of insert passage 16 prevents the keyway insert 13 from moving radially from the passage 16 into the bores 11 and 18. This feature also is seen to exist for passage configurations for retaining inserts, 35, 37, 41 and 43 in FIGS. 5a, b, c, and d respectively.

Retaining means for keyway insert 13 in FIG. 3a operates either by extending set screw 28 into clearance hole 25 from threaded hole 24 thus barring axial movement of the insert in the groove 16, or by forcing set screw 28 against key 23, after installation of shaft coupling 10 on shaft 22, thereby jamming insert 13 against the sides of groove 16 thus securing it in place.

Retaining means in FIG. 3b operates to secure the keyway insert 13 in the passage 16 by installing the screws 29 to hold the spring clips 31 in place. Spring clips 31 bear against the ends of insert 13 to retain it in place. The retaining means in FIG. 3c may be used only when the material of the shaft coupling 10 in which passage 16 is formed is made of a material having some elasticity or memory. Insert 13 must force depending edges 34 aside during removal from and insertion in passage 16, and edges 34 must subsequently assume a position to retain the insert 13. A press fit or interference fit is another simple way to retain said insert 13 without use of edges 34. FIG. 3d shows keyway insert 13 having a notch 32 that permits axial retention by mating with an inward projection 33 on coupling 10.

The inserts shown in FIGS. 1, 2, and 5a, b, c and d may be molded in the shaft coupling 10 at formation, or the passages may be formed to fit a particular insert shape to be subsequently installed. The inserts may have the face which communicates with the bore machined simultaneously with the bore if the material of the shaft coupling 10 surrounding the bore has sufficient strength to support the stress imposed by the machining process. In the event the material does not have sufficient strength the insert may be removed and the bore may be formed. A configuration matching that of the bore is placed on the insert face by a machining operation followed by formation of the keyway.

For the instance where the material of the shaft coupling 10 is sufficiently strong the process involves leaving insert 13 in place in passage 16, if cast in place, or installing insert 13 in passage 16 if the latter is formed without the insert in place. Thereafter a shaft bore, typified by bore 18 in FIG. 2, is formed using conventional methods. The bore radius is thus formed simultaneously inside the shaft coupling 10 and on the inner face of insert 13. Insert 13 is then removed from passage 16 by releasing the retaining means. The keyway represented at 19 in FIG. 2 is placed in the face of insert 13 which is in communication with bore 18 when the insert is installed using conventional machining methods such as milling. The insert 13 is reinstalled and held in passage 16 by retaining means such as one of those shown in FIGS. 3a, b, and c. Shaft coupling 10, with the insert 13 retained therein is thereafter ready for mounting on shaft 22 with the keyway 19 surrounding key 23. In this manner shaft coupling 10 is prevented from rotating relative to shaft 22.

Referring to FIG. 7 no bore is shown in shaft coupling 10 but the bore sizes which will accommodate various shaft sizes and provide keyways therefor are determined as follows. $R_1$ extends from the axis of member 10 to the innermost face of insert 47 and represents the smallest bore for which a keyway may be provided. The range of bore radii from $R_1$ to $R_2$ to accommodate shafts of substantially the same radii is provided with a keyway in insert 47. Note that the innermost face of insert 48 is on the radius $R_2$ which is shorter than a radius intersecting the junction of the sides of insert 47. Bores with a radius larger than $R_2$ will remove so much of the center portion of shaft coupling 10 that the passage in which insert 47 lies will no longer retain the insert 47 radially and it will fall into the bore.

Insert 48 will serve to provide a keyway for shaft sizes requiring bores with radii in the range between $R_2$ and $R_3$. Insert 49 will provide a keyway for shaft sizes requiring bores with radii in the range of $R_3$ to $R_4$. The number of inserts and the ranges of radii may vary. The inserts in this embodiment become increasingly large as the radius upon which they are located increases. This feature allows keyways of larger dimension to be formed in the inserts as the shaft size and matching bore increase.

Insert 50 is an illustration of an insert which may have one or more preformed keyways such as 51 and 52. Keyway 51 may be a standard size in one application for a shaft requiring a bore with radius $R_1$. Keyway 52 may be a standard size for an application using a shaft with a larger radius than $R_1$. To use keyway 52, insert 50 is removed from passage 16, rotated 180° and reinstalled with keyway 52 facing inwardly toward the bore. A bore having a radius touching the insert face in which keyway 52 is located is placed in the shaft coupling and it is ready for installation on the keyed shaft.

Inserts accommodating varying keyway sizes and configurations for a single shaft diameter requiring a bore of one diameter are shown in FIG. 8. Insert 53 is the smallest and provides keyway 54. Insert 55 provides a larger keyway 56. Insert 59 provides a triangular shaped keyway 60 in this embodiment. Insert 61 provides the largest keyway 62. This configuration is useful for providing a shaft coupling 10 for mounting on shafts having the same diameter but which have varying applications requiring varying key sizes and configurations.

Insert 68 in FIG. 9 illustrates an embodiment which provides various keyway configurations 69, 70 and 71 for a shaft having a radius substantially equal to $R_3$. The keyways 69, 70 and 71 may be preformed or formed as needed and the insert installed with the keyway necessary for matching the shaft key facing inward on radius $R_8$.

A shaft coupling for mounting on a keyed shaft is provided which may be bored to fit the shaft, and which has an insert in which a keyway may be formed to fit the shaft key. The keyway may be cut using simple milling processes while the keyway insert is removed from the shaft coupling. A plurality of keyway inserts may be provided to serve shafts of varying ranges of diameters and to provide keyways of the same or varying configuration. A plurality of keyway inserts may be provided to serve shafts having one range of diameters and to provide keyways of the same or varying configuration. The keyway inserts are positively retained in the keyway passages and may have several keyways formed thereon for use with shafts having different key configurations.

We claim:

1. A shaft coupling for installation on a cylindrical shaft having a key therein, comprising a central portion having a bore formed therein to fit the shaft and having additional surfaces defining a retaining groove parallel to and in communication with said bore, an insert having a polygonal cross section and external planar surfaces, said insert being formed to slidably fit in said retaining groove thereby preventing rotation of said insert in said retaining groove, said insert further being formed to assume one of a plurality of rotated positions in said retaining groove, whereby one of said insert external planar surfaces is in communication with said bore, a keyway formed in at least two of said insert external planar surfaces for receiving the key so that said insert may be installed in one of said rotated positions and said keyway may be placed in communication with said bore to engage the key, and means for retaining said insert in said retaining groove, thereby preventing rotation of the shaft coupling relative to the shaft.

2. A shaft coupling as in claim 1 wherein said insert planar surface in communication with said bore differs in radial distance from the axis of said bore dependent upon said rotated position, so that the bore diameter may be adjusted to fit a plurality of matching shaft diameters.

3. A shaft coupling as in claim 1 together with an additional keyway in another of said insert planar surfaces, wherein said additional keyway differs in configuration to accommodate a key of differing shape.

4. An insert for placement in a shaft coupling having a through axial bore and surfaces defining a retaining groove along one wall of the bore in communication therewith for mounting the shaft coupling on a shaft having a diameter substantially matching the bore diameter and having a key mounted in the shaft, comprising an elongate member having planar surfaces shaped to contact at least some of the surfaces defining the retaining groove and having a polygonal cross sectional shaft for preventing rotation of said elongate member in the retaining groove, said elongate member having a plurality of discrete rotational insert positions about its longitudinal axis in which said elongate member may be placed in the groove, whereby one of said planar surfaces is in communication with the bore, a keyway formed in at least two of said planar surfaces to fit the key so that one of said keyways may be placed in communication with the bore to engage the key, thereby preventing rotation of the shaft coupling relative to the shaft, and means for retaining said elongate member in the retaining groove.

5. An insert as in claim 4 wherein said planar surfaces differ in radial distance from the axis of the bore depending on said elongate member rotational position so that different matching bore and shaft diameter combinations may be used having radii substantially the same as the radial distance from the axis of the bore to said one planar surface.

6. An insert as in claim 4 together with an additional keyway and wherein said additional keyway differs in configuration to accommodate a key of differing shape.

7. A shaft coupling for installation on a cylindrical shaft having a key in the periphery thereof, comprising a central portion having a shaft bore formed therein to fit the shaft, a plurality of retaining bores having planar walls extending through said central portion and having longitudinal axes at different distances from and parallel to the axis of said bore, at least one of said plurality of retaining bores intersecting said shaft bore, an insert formed to fit within said one retaining groove, said insert having a polygonal cross section thereby preventing rotation of said insert in said one retaining bore, said insert having a keyway formed therein for engaging said key, said keyway being in communication with said shaft bore, and means for retaining said insert in said one retaining bore, so that when said shaft bore is adjusted in diameter to match the shaft diameter, different ones of said plurality of retaining bores may be used for holding said insert.

* * * * *